United States Patent
Cash et al.

(10) Patent No.: US 8,493,221 B2
(45) Date of Patent: Jul. 23, 2013

(54) FILTER FOULING DETECTION USING COMPARATIVE TEMPERATURE RISE ANALYSIS

(75) Inventors: Kevin M. Cash, Cary, NC (US); Jason A. Matteson, Raleigh, NC (US); Mark E. Steinke, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/822,473

(22) Filed: Jun. 24, 2010

(65) Prior Publication Data

US 2011/0316706 A1 Dec. 29, 2011

(51) Int. Cl.
 *G08B 17/00* (2006.01)
(52) U.S. Cl.
 USPC ........... 340/584; 340/581; 340/588; 340/589; 340/870.17; 236/49.2; 236/49.3; 702/45
(58) Field of Classification Search
 USPC ................. 340/584, 581, 585, 588, 589, 635, 340/870.17, 577, 607; 62/127, 130; 219/445.1, 219/446.1; 236/49.2, 49.3; 702/45, 130
 See application file for complete search history.

(56) References Cited

U.S. PATENT DOCUMENTS

| | | | |
|---|---|---|---|
| 5,689,963 A | 11/1997 | Bahel et al. | |
| 6,167,588 B1 | 1/2001 | Dyson | |
| 6,225,907 B1 * | 5/2001 | Derryberry et al. | 340/584 |
| 6,319,114 B1 * | 11/2001 | Nair et al. | 454/184 |
| 6,758,051 B2 | 7/2004 | Jayanth et al. | |
| 6,889,908 B2 | 5/2005 | Crippen et al. | |
| 7,082,369 B1 | 7/2006 | Rubin et al. | |
| 7,261,762 B2 * | 8/2007 | Kang et al. | 95/1 |
| 7,453,052 B2 * | 11/2008 | Midgley | 219/448.19 |
| 7,494,536 B2 | 2/2009 | Kang et al. | |
| 7,979,250 B2 * | 7/2011 | Archibald et al. | 703/5 |
| 2008/0316038 A1 * | 12/2008 | Palaszewski | 340/584 |
| 2009/0206059 A1 * | 8/2009 | Kiko | 218/143 |
| 2010/0245279 A1 * | 9/2010 | Kubis et al. | 345/173 |
| 2011/0295524 A1 * | 12/2011 | Tada et al. | 702/45 |

FOREIGN PATENT DOCUMENTS

| | | |
|---|---|---|
| FR | 2929645 A1 | 10/2009 |
| JP | 07143663 A | 2/1995 |
| JP | 200954714 A | 3/2009 |
| JP | 2009264225 A2 | 11/2009 |

OTHER PUBLICATIONS

Mouzinho et al., "Indirect Measurement of the Temperature Via Kalman Filter", XVIII IMEKO World Congress, Metroloty for a Sustainable Development, Sep. 17-22, 2006, Rio de Janeiro, Brazil, 6 pages.

* cited by examiner

*Primary Examiner* — Hung T. Nguyen
(74) *Attorney, Agent, or Firm* — Cynthia G. Seal; Jeffrey L. Streets

(57) ABSTRACT

One embodiment involves detecting the fouling of an air filter used to filter airflow entering a computer system. An expected airflow rate is obtained from a current fan speed. An expected temperature rise between two positions is computed as a function of the expected airflow rate and the power consumption of heat-generating components, such as servers. An actual temperature rise is obtained from temperature sensors. An electronic alert is automatically generated in response to the actual temperature rise exceeding the expected temperature rise by a setpoint. Different setpoints may be used to trigger distinct electronic alerts.

20 Claims, 2 Drawing Sheets

FILTER FOULING DETECTION USING COMPARATIVE TEMPERATURE RISE ANALYSIS

BACKGROUND

1. Field of the Invention

The present invention relates to cooling a computer system using filtered airflow.

2. Background of the Related Art

A computer system generates heat as a result of consuming electrical power. In many computer systems, an air-moving device of some type (e.g. a fan or blower) is used to generate airflow through the computer to maintain system temperatures within specified temperature limits. An air filter may be used to filter out dust and other contaminants from this airflow. The use of an air filter may greatly reduce the rate at which dust and contaminants accumulate in the system, thus reducing the service requirements and extending the life of the computer system and its components. However, an air filter also presents impedance to airflow through the computer system. As the filter becomes fouled over time, the airflow impedance presented by the airflow increases, which can reduce the airflow rate and increase the power required to cool the computer system. A fouled air filter may also be less effective at filtering airflow. Thus, the air filter must be periodically replaced or cleaned.

BRIEF SUMMARY

One embodiment of the present invention provides a method that may be used for identifying a fouled air filter. An actual temperature rise between first and second locations along an airflow path through a chassis is measured. The chassis contains one or more heat-generating components in the airflow path and an air filter in the airflow path upstream of the heat-generating components. The second location is downstream of the first location, so the temperature at the second (downstream) location is expected to be higher than the temperature at the first (upstream) location. An expected temperature rise between the first and second locations is computed as a function of both an expected airflow rate and a power consumption of the heat-generating components. A first electronic alert is automatically generated in response to the difference between the actual temperature rise and the expected temperature rise exceeding a setpoint. The method may be performed by executing computer usable program code included with a computer program product, wherein the computer usable program code is embodied on a computer usable storage medium.

Another embodiment of the invention provides a computer system that includes a chassis, and a plurality of servers, a blower module, and a management module in the chassis. The chassis defines an airflow pathway. The blower module has a fan blade and is configured for generating airflow through the airflow pathway of the chassis at a known fan speed. The servers are modular servers independently and removably inserted in the chassis within the airflow pathway. An air filter is removably positioned in the airflow pathway upstream of the servers. A first temperature sensor is positioned at a first location in the airflow pathway and a second temperature sensor is positioned at a second location in the airflow pathway downstream of the first location. The management module is in communication with the first and second temperature sensors and the blower module. The management module is configured for measuring an actual temperature rise as the difference between a temperature measured with the second temperature sensor and a temperature measured with the first temperature sensor. The management module also computes an expected temperature rise between the first and second locations as a function of both an expected airflow rate and a power consumption of the servers. The management module automatically generates a first electronic alert in response to the difference between the actual temperature rise and the expected temperature rise exceeding a setpoint.

DETAILED DESCRIPTION

Figure 1:
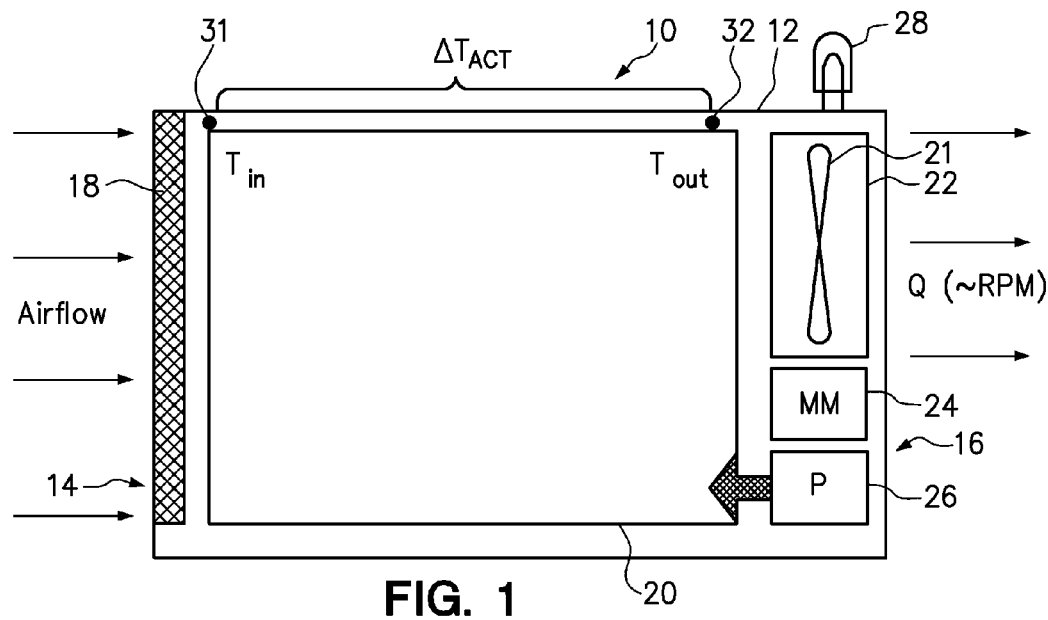
FIG. 1 is a schematic diagram of a computer system configured for detecting fouling of an air filter by analyzing a temperature rise.

Embodiments of the present invention include systems and methods for detecting the fouling of an air filter in a computer system by analyzing a temperature rise in the computer system. In one example embodiment, a computer system includes a plurality of heat-generating components, such as servers installed in a server chassis. An air moving device, such as a fan or blower module, generates airflow through the server chassis to cool the servers. An air filtration system includes a replaceable air filter installed upstream of the servers to capture airborne particulate matter from the airflow prior to reaching the servers. The air moving device is driven at a controlled speed or power, for generating the airflow at a controlled airflow rate. The term "airflow rate" may refer to either a volumetric airflow rate or a mass airflow rate. An expected airflow rate is determined based on the speed or power of the air moving device, and a predefined relationship between the speed or power and airflow rate obtained during a calibration phase using a clean filter.

A temperature rise normally occurs between two positions along the airflow pathway within the computer system, due to heat transfer from heat-generating components within the computer system to the air flowing through the computer system. The two positions may include, for example, a first position proximate an air inlet of the chassis and a second position proximate an air outlet of the chassis. The second position is downstream of the first position. In one example, the first position is upstream of the heat-generating components and the second position is downstream of the heat-generating components. A temperature sensor is provided at each of the first and second positions for continuously or periodically providing a temperature reading to a controller embodied as a management module. The temperature sensors may be disposed in the chassis specifically for detection of filter fouling or may be selected from sensors already available in the chassis for purposes other than detecting air filter fouling as described herein. A controller may use the signals from the temperature sensors to determine an actual temperature rise between the first and second positions. An expected temperature rise between the same two positions is also computed by the controller using a mathematical formula, when the controller is provided with the amount of power currently being consumed by the heat-generating components and the expected airflow rate through the chassis. The controller may then compare the actual temperature rise to the expected temperature rise in order to detect fouling of the air filter.

As the air filter becomes increasingly fouled with particulate matter, the airflow impedance presented by the air filter increases, and the airflow rate through the chassis is reduced accordingly. However, the air moving device is generally powerful enough to maintain a constant operating speed despite the increased airflow impedance, so that the actual airflow rate through the chassis when the filter is fouled is less than the airflow rate that would be expected based solely on the operating speed of the air moving device. As a result of filter fouling, the actual temperature rise, as measured with the temperature sensors, will be greater than the expected temperature rise, as computed when power consumption and operating speed are entered into the formula.

An alert may be generated, or other action taken, when the difference between the actual temperature rise and the expected temperature rise exceed a setpoint value representative of a filter fouling condition. Multiple setpoints may be used, each generating a distinct alert or action. For example a lower setpoint may trigger a warning message while allowing continued operation of the computer system, and an upper setpoint may trigger automatic corrective action, such as powering down or reducing power to the computer system.

FIG. 1 is a schematic diagram of a computer system 10 configured for detecting fouling of an air filter 18 by analyzing a temperature rise, according to an embodiment of the invention. The computer system 10 has a plurality of air cooled servers 20 installed in a chassis 12. The servers 20 are modular, in that each server 20 may be independently inserted and connected within the chassis 12, and alternately removed from the chassis 12. For example, the servers 20 may be blade servers that receive shared resources, such as power, cooling, and network connectivity, from a plurality of support modules in the chassis 12. The support modules shown in FIG. 1 include a blower module 22, a management module 24, and a power supply 26. The power supply 26 provides electrical power to all of the servers 20. The servers 20 include components that generate heat (i.e., heat-generating components) as a result of operations using the electrical power. The blower module 22 is an example of an air-moving device that cools the servers 20 by generating airflow through the chassis 12 from an air inlet 14 to and air outlet 16 of the server chassis 12. The management module 24 manages chassis resources, such as by allocating and controlling the distribution of power from the power supply 26 to the servers 20. The management module 24 may also monitor system parameters such as power consumption and temperatures and automatically generate an electronic system alert if a problem arises, such as if internal temperatures exceed predefined limits. For example, the management module 24 may cause the illumination of a warning lamp, such as an LED 28, and/or send a message to a system administrator's workstation as part of a system alert.

The blower module 22 includes one or more electronically controllable fan blade 21. The fan blade 21 may be of any type suitable for generating airflow, such as an axial, centrifugal, or crossflow blade. The blower module 22 may drive the fan blade 21 at a controlled rotational rate (i.e. "fan speed"), which may be measured by revolutions per minute (RPMs). Typically, the blower module operates directly or indirectly under the control of the management module.

The air filter 18 is provided at the chassis air inlet 14 to filter out airborne particulate matter, such as dust and dirt, from the air prior to entering the chassis 12. The airflow rate (Q) varies directly with the fan speed. A predetermined relationship between fan speed and airflow rate may be obtained, such as by directly measuring the airflow rate for one or more different values of fan speed using a clean air filter. The predetermined relationship between fan speed and airflow rate is used to determine an expected airflow rate corresponding to the currently detected fan speed. This expected airflow rate may then be used in calculations described below to determine an expected temperature rise through the chassis. However, the airflow impedance presented by the air filter 18 increases as the air filter 18 progressively accumulates matter trapped from the airflow (i.e. gets clogged). Thus, for any given fan speed, the actual airflow rate through the chassis decreases as the air filter 18 gets progressively more clogged. An expected temperature rise computed using the expected airflow rate and the known component power consumption may be compared to an actual temperature rise measured using the temperature sensors 31, 32 to detect the degree of fouling of the air filter 18.

The airflow is heated by the heat-generating components within the servers 20 as the airflow passes through the chassis 12. As a result of this heating, a temperature rise is observed between a first location along the airflow path and a second location downstream from the first location. For example, an inlet temperature sensor 31 is positioned at a first location near the air inlet 14 of the server chassis 12, and an outlet temperature sensor is positioned at a second location near the air outlet 16 of the server chassis 12. A temperature rise ($\Delta T$) occurs between the air inlet 14 and the air outlet 16. The temperature rise may be determined by subtracting an inlet temperature ($T_{in}$) measured by the inlet temperature sensor 31 from an outlet temperature ($T_{out}$) measured by the outlet temperature sensor 32.

Under normal operating conditions, the components within the servers 20 operate safely and reliably at elevated operating temperatures downstream of the air inlet 14, with the blower module 22 generating sufficient airflow to keep internal component operating temperatures well within specified limits. However, as the air filter 18 accumulates particular matter and causes the actual airflow rate to be lower than an expected airflow rate for the currently detected fan speed, an actual temperature rise measured by the temperature sensors 31, 32 will grow larger than the value of the temperature rise expected based on the expected airflow rate and current component power consumption. The difference between the actual temperature rise and the expected temperature rise may be used as an indicator of the extent to which the air filter 18 is fouled. The air filter 18 should be cleaned or replaced prior to becoming so fouled that the resulting reduction in airflow may cause undesirably high operating temperatures or an unacceptable level of efficiency. Therefore, a setpoint amount of difference between actual and expected airflow temperature rise may be selected to determine when remedial action is needed, i.e., the filter needs to be cleaned or replaced. An electronic alert may be automatically generated when the difference between the actual temperature rise and the expected temperature rise exceeds the setpoint. The alert may include automatically illuminating the LED 28, displaying a status message, or generating an e-mail notification.

Figure 2:
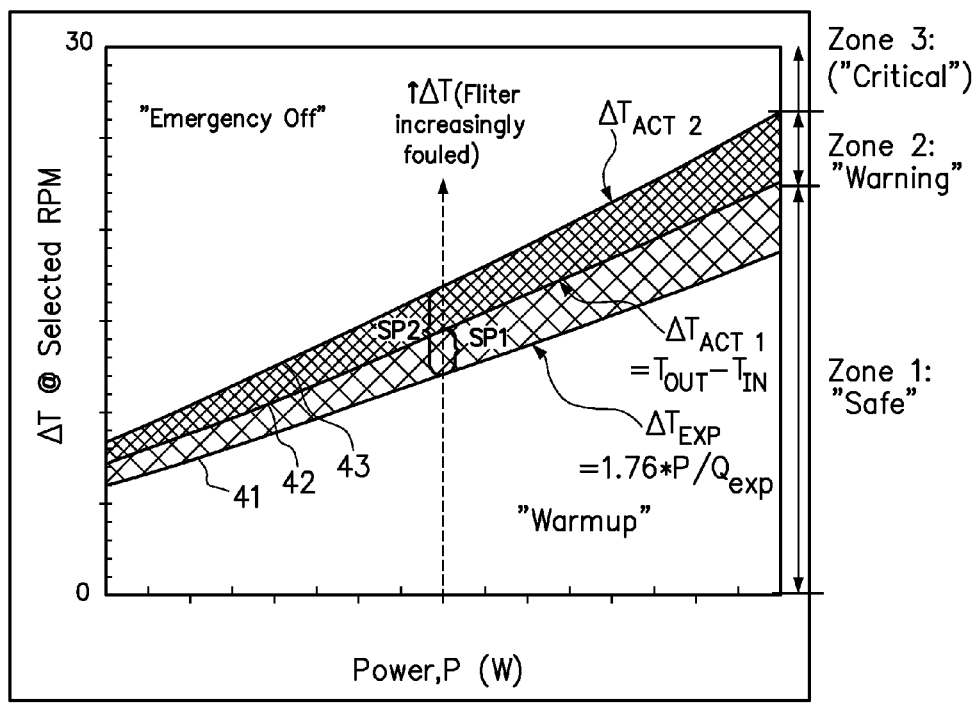
FIG. 2 is a graph of a computer system temperature differential as a function of power consumed by the computer system, including a first line representing the expected temperature rise using a clean air filter and second and third lines representing the temperature rise that occurs as the air filter becomes progressively fouled.

FIG. 2 is a graph describing how a temperature rise in a computer system may increase as an air filter becomes progressively fouled. The graph plots temperature rise as a function of power consumed by heat-generating components (e.g. servers) of the computer system. Accordingly, the vertical axis represents a temperature rise, in Celsius (C), and the horizontal axis represents power consumption "P" of the servers, in Watts (W). The power consumption in the chassis may be obtained using power measurements made by other programs, such as an IBM "Active Energy Manager." The graph assumes a specific, steady-state value of fan speed as measured in RPM, such that the airflow rate "Q" decreases as the filter traps particulate matter. For a fan operable at more than one controlled fan speed, a different graph such as the graph in FIG. 2 could be obtained for each fan speed. Also, a predefined relationship between the expected fan speed and airflow rate may be obtained for each of a plurality of different fan speeds at which the fan is operable, as described above in reference to a calibration phase.

A first curve 41 in the graph represents the temperature rise expected under idealized, steady-state conditions of power consumption and airflow rate, when the air filter is new or otherwise clean. A clean air filter presents its lowest possible airflow impedance to the computer system. A formula for computing this expected temperature rise is $T_{out}-T_{in}=k*P/Q$, where k is a constant. In one example, k is empirically determined to be 1.76 for a power consumption (P) in Watts and a volumetric airflow flow rate (Q) in cubic feet per minute (cfm). As indicated by the first curve 41, the expected temperature rise ($\Delta T_{EXP}$) increases with increasing power consumption, as a result of an increasing amount of heat being generated by the server components and transferred to the airflow. The area below the first curve 41 is referred to in the graph as a "warmup" region, representing a temperature rise prior to the computer system reaching a steady-state. For example, when the computer system is first powered on and the servers and other components are still warming up, the actual temperature rise will initially be less than the value in the first curve 41 for any power consumption and fan speed values. Once the system has warmed-up closer to a steady state condition, the actual temperature rise is expected to operate somewhere along the first curve 41 while the air filter is substantially clean.

A second curve 42 represents an actual temperature rise ($\Delta T_{ACT1}$) that would result from an air filter that has accumulated enough particulate matter to reduce the airflow rate Q, but is not yet fouled enough to require cleaning or replacement. For a given fan speed (RPM), the actual airflow rate decreases due to the increasing airflow impedance presented by the air filter. The second curve 42 is therefore higher than the first curve 41, indicating that for any power consumption value P, the temperature rise along the second curve 42 is higher than the temperature rise along the first curve 41.

A third curve 43 represents an actual temperature rise ($\Delta T_{ACT2}$) that would result from an air filter that has accumulated even more particulate matter than represented by the second curve 42, such that the air filter is fouled enough to require replacement. The actual airflow rate may be reduced by the air filter to such a degree that, for example, the airflow rate or the efficiency of the computer system may be unacceptably low, or the air filter may perform unsatisfactorily at preventing the intrusion of contaminants. The third curve 43 is therefore higher than the second curve 42. For any value of P, the temperature rise along the third curve 43 is higher than the temperature rise along the second curve 42 due to the unacceptably reduced airflow rate.

The difference between the actual temperature rise using a fouled air filter and an expected temperature rise assuming a clean filter may be compared to a setpoint as an indication of the degree to which the air filter is fouled. A first example setpoint "SP1" equal to the difference between the second curve 42 and the first curve 41 may be used to trigger a first alert. For a given power consumption value P, the first setpoint SP1 is equal to the difference between the actual temperature rise (on the second curve 42) and the expected temperature rise using a clean filter (on the first curve 41). A second, higher setpoint "SP2" equal to the difference between the third curve 43 and the first curve 41 may be used to trigger a second alert distinct from the first alert. Any number of setpoints and alerts may be used, and, as previously discussed, automatic actions may also be associated with one or more of the alerts.

The graph establishes a convention, for purpose of discussion, wherein the system is in a first zone ("Zone 1: 'Safe'") when operating anywhere below the second curve 42, in a second zone ("Zone 2: 'Warning'") when operating anywhere between the second curve 42 and the third curve 43, and a third zone ("Zone 3: '"Critical"'") when operating anywhere above the second curve 42. In Zone 1, the actual temperature rise for a given value of P is below the second curve 42, indicating that the difference between the actual temperature rise and expected temperature rise is less than the first setpoint SP1. Thus, in Zone 1, the system is operating with an acceptable temperature rise, and no alert is generated. When Zone 2 is reached, the difference between the actual temperature rise and the expected temperature rise is equal to or greater than SP1 but less than SP2, in response to which the first electronic alert is automatically generated. For example, the first alert triggered by equaling or exceeding the first setpoint SP1 may simply be a warning, and the system may continue to operate normally. Upon entering Zone 3, the difference between the actual temperature rise and the expected temperature rise is equal to or greater than the second setpoint SP2, in response to which the second electronic alert is automatically generated. The second alert triggered by the second setpoint SP2 may be a more serious warning. For example, the second alert may trigger corrective action, such as automatically reducing power to the servers or powering off the servers. The corrective action may prevent operating the computer system at an unsatisfactorily low efficiency. Also, avoiding an excessive temperature rise may indirectly avoid excessive temperatures, in that downstream temperatures may become elevated due to poor airflow as a result of a fouled air filter.

The value of a setpoint may be dynamically computed, and may vary with the value of power consumption P. In one example implementation, the setpoint SP1 may be dynamically computed according to a maximum allowable reduction in airflow rate predefined for the computer system. In particular, the setpoint may be computed as the difference between an expected temperature rise at a first airflow rate and an expected temperature rise at a second airflow rate, wherein the second airflow rate is equal to the first airflow rate as reduced by the maximum allowable airflow reduction. The formula $T_{out}-T_{in}=k*P/Q$ may be used to dynamically compute the expected temperature rise. As part of the dynamic computation of expected temperature rise, the expected airflow rate "$Q_{exp}$" may be obtained from the predetermined relationship between fan speed and airflow rate using a clean air filter, as discussed above. The actual fan speed is typically detected by a sensor in the fan housing and reported to management controller. Accordingly, the expected airflow rate $Q_{exp}$ and known values of P and k may then be plugged into the formula to determine the expected temperature rise assuming a clean air filter. An elevated temperature rise may also be computed, by plugging in the same values of P and k, along with a reduced airflow rate.

In one example, a maximum reduction in airflow rate selected for a system is 20%, and the current power consumption P is 500 W. Based on a predefined relationship between airflow rate and fan speed for a clean air filter, the current fan speed is expected to produce an airflow rate of 31 cfm. Using these example values, the expected temperature rise at the airflow rate of 31 cfm using the formula $T_{out}-T_{in}=k*P/Q$ is 1.76*500/31=28.4 C. Using the maximum reduction in airflow rate of 20%, the reduced airflow rate is expected to be 80% of 31 cfm. Thus, the elevated temperature rise assuming a reduced airflow rate using the same formula is 1.76*500/(0.80*31)=35.5 C. The difference between the two temperature rise values is 7.1 C. To account for a hypothetical temperature sensor accuracy of +/−0.5 C, the value of the first setpoint SP1 at that moment may be selected as 6.1 C. This setpoint calculation may be repeatedly performed during operation of the computer system. As system parameters change, such as airflow rate and power consumption, the dynamically-computed setpoint SP1 changes accordingly. The value of SP2 may be similarly computed, except using a larger airflow reduction (e.g. larger than 20% reduction in this example) as the basis for the computation.

Figure 3:
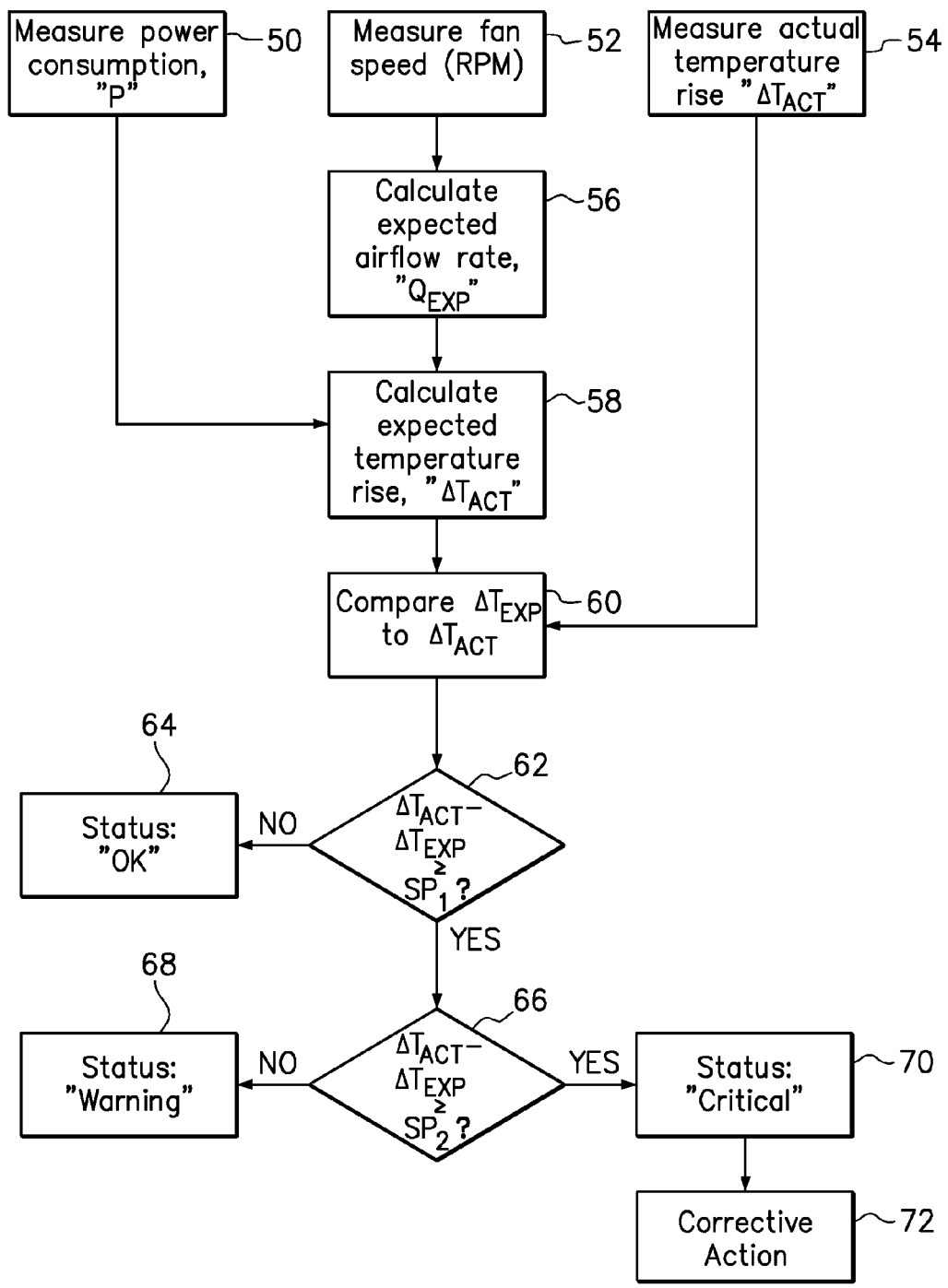
FIG. 3 is a flowchart generally outlining a method of monitoring a computer system to detect the fouling of an air filter.

FIG. 3 is a flowchart generally outlining a method of monitoring a computer system to detect the fouling of an air filter. Steps of the flowchart may be further supported by reference to the discussion of the system diagram of FIG. 1 and the graph of FIG. 2. The method outlined in the flowchart may be performed on a computer system having an air-moving device (e.g. blower module or fan) for generating airflow through a chassis, and a filtration system having an air filter for removing particulate matter from airflow prior to the airflow entering servers or other equipment in the chassis. The computer system is designed to operate satisfactorily over a range of airflow rates, with sufficient excess capacity to account for a diminishing airflow rate caused by the gradual accumulation of particulate matter on the other filter. The method may be used to detect the fouling of the air filter, and generate distinct alerts depending on the degree of fouling and the corresponding effect on a temperature rise measured within the server chassis.

In step 50, the power consumption of a plurality of servers is measured. In step 52 the speed of an air-moving device is measured, such as the fan speed of a fan or blower module used to generate airflow through the computer system. By way of example, a fan speed in RPMs is used in the flowchart. In step 54 an actual temperature rise is measured using temperature sensors. The temperature sensors may be included with the chassis, the servers, or a combination thereof. Steps 50, 52, and 54 may be performed in parallel, as indicated.

In step 56 an expected airflow rate is calculated. The expected airflow rate is obtained according to the fan speed measured in step 52. The expected airflow rate may be obtained, for instance, from a predefined relationship between fan speed and airflow rate obtained during a calibration phase for a specific computer system. During the calibration phase, an airflow rate through the computer system may be measured at a plurality of different speeds of the air-moving device. The airflow rate may be obtained using a volumetric airflow sensor, as generally known in the art apart from a specific application in this embodiment. The airflow rate may alternatively be obtained using a mass airflow sensor, although the formula used to predict an expected temperature rise would need to be selected according to whether a volumetric airflow sensor or a mass airflow sensor were used. The calibration phase may be performed using a clean air filter, which has not accumulated an appreciable amount of particulate matter, and therefore which imposes only its minimum value of airflow impedance on the computer system. This relationship may be stored in a lookup table or other electronic format, for reference during operation of the computer system and the accompanying air filtration system.

In step 58, an expected temperature rise is calculated based on the power measured in step 50, and the expected airflow rate obtained in step 56. The expected temperature rise may be computed, for example, from the formula $T_{out}-T_{in}=k*P/Q$, where k is a constant (e.g. 1.76) for a power consumption in Watts and a volumetric airflow flow rate in cubic feet per minute (cfm). In step 60, the expected temperature rise computed in step 58 is compared to the actual temperature rise measured in step 54. Step 62 involves comparing the difference between the actual temperature rise and the expected temperature rise to a first setpoint. If the temperature difference between the expected temperature rise and the actual temperature rise is greater than or equal to the first setpoint, then in step 64 a status indicator indicates the status of the computer system is "OK" and no alert is generated. However, if the temperature difference between the expected temperature rise and the actual temperature rise is greater than or equal to the first setpoint, then the temperature difference is next compared to the second setpoint in conditional step 66. If the temperature difference between the expected temperature rise and the actual temperature rise is greater than or equal to the first setpoint, as determined in conditional step 62, but less than the second setpoint as determined in conditional step 66, then a "warning" alert is generated in step 68. Otherwise, if the temperature difference between the expected temperature rise and the actual temperature rise is greater than the second setpoint, then a "critical" status is entered in step 70, in response to which corrective action is automatically taken in step 72. Corrective action may include steps to avoid inefficient operation of the computer system or potentially excessive temperatures. For example, the corrective action may include reducing power to the computer system or powering down the computer system until the air filter has been cleaned or replaced.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. For example, in the embodiment of FIG. 1, the computer program instructions may be loaded onto the memory module 24 or a memory storage device accessible by the memory module 24, so that the memory module 24 may perform some or all of the steps of the method.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   measuring an actual temperature rise between first and second locations along an airflow path through a chassis, the chassis containing one or more heat-generating components in the airflow path and an air filter in the airflow path upstream of the heat-generating components, wherein the first location is upstream of the heat-generating components and the second location is downstream of the heat-generating components;
   computing an expected temperature rise between the first and second locations as a function of both an expected airflow rate and a power consumption of the heat-generating components; and
   automatically generating a first electronic alert in response to the difference between the actual temperature rise and the expected temperature rise exceeding a setpoint.

2. The method of claim 1, wherein the first location is proximate an air inlet at which the airflow enters the chassis and the second location is proximate an air outlet at which the airflow exits the chassis.

3. The method of claim 1, further comprising:
obtaining the expected airflow rate through the chassis as a function of a speed of an air-moving device used to generate the airflow.

4. The method of claim 3, further comprising:
measuring airflow rate at a plurality of different speeds of the air-moving device to obtain a predefined relationship between the speed of the air-moving device and the measured airflow rate prior to trapping particulate matter from the airflow with the air filter; and
selecting the expected airflow rate from the predefined relationship between the speed of the air-moving device and the measured airflow rate obtained prior to trapping particulate matter from the airflow with the air filter.

5. The method of claim 1, wherein the step of automatically generating an electronic alert comprises:
generating an alert message, generating an e-mail alert, or illuminating an LED.

6. The method of claim 1, further comprising:
automatically generating a second electronic alert distinct from the first electronic alert in response to the difference between the actual temperature rise and the expected temperature rise exceeding a second setpoint.

7. The method of claim 6, further comprising automatically reducing power to the heat-generating components or powering down the heat-generating components in response to generating the second electronic alert.

8. The method of claim 1, further comprising:
selecting a maximum allowable airflow reduction; and
computing the setpoint as the difference between an expected temperature rise at a first airflow rate and an expected temperature rise at a second airflow rate, wherein the second airflow rate is equal to the first airflow rate as reduced by the maximum allowable airflow reduction.

9. The method of claim 8, further comprising:
computing the first airflow rate as an expected airflow rate selected according to a speed of an air-moving device used to generate the airflow.

10. The method of claim 1, further comprising:
computing the expected temperature rise as $k*P/Q$, where k is a predefined constant, P is the power consumption of the heat-generating components, and Q is the expected airflow rate computed as a function of fan speed.

11. A computer program product including computer usable program code embodied on a computer usable storage medium, the computer program product including:
computer usable program code for measuring an actual temperature rise between first and second locations along an airflow path through a chassis, the chassis containing one or more heat-generating components in the airflow path and an air filter in the airflow path upstream of the heat-generating components, wherein the first location is upstream of the heat-generating components and the second location is downstream of the heat-generating components;
computer usable program code for computing an expected temperature rise between the first and second locations as a function of both an expected airflow rate and a power consumption of the heat-generating components; and
computer usable program code for automatically generating a first electronic alert in response to the difference between the actual temperature rise and the expected temperature rise exceeding a setpoint.

12. The computer program product of claim 11, further comprising:
computer usable program code for obtaining the expected airflow rate through the chassis as a function of a speed of an air-moving device used to generate the airflow.

13. The computer program product of claim 11, further comprising:
computer usable program code for automatically generating a second electronic alert distinct from the first electronic alert in response to the difference between the actual temperature rise and the expected temperature rise exceeding a second setpoint.

14. The computer program product of claim 11, further comprising:
computer usable program code for automatically reducing power to the heat-generating components or powering down the heat-generating components in response to generating the second electronic alert.

15. The computer program product of claim 11, further comprising:
computer usable program code for computing the first airflow rate as an expected airflow rate selected according to a speed of an air-moving device used to generate the airflow.

16. A computer system, comprising:
a chassis defining an airflow pathway;
a blower module having a fan blade configured for generating airflow through the airflow pathway of the chassis at a known fan speed;
a plurality of modular servers independently and removably inserted in the chassis within the airflow pathway;
an air filter removably positioned in the airflow pathway upstream of the servers;
a first temperature sensor positioned in the airflow pathway at a first location upstream of the servers and a second temperature sensor positioned in the airflow pathway at a second location downstream of the servers;
a management module in communication with the first and second temperature sensors and the blower module, the management module configured for measuring an actual temperature rise as the difference between a temperature measured with the second temperature sensor and a temperature measured with the first temperature sensor, computing an expected temperature rise between the first and second locations as a function of both an expected airflow rate and a power consumption of the servers, and automatically generating a first electronic alert in response to the difference between the actual temperature rise and the expected temperature rise exceeding a setpoint.

17. The computer system of claim 16, wherein the chassis comprises an air inlet at which airflow enters the chassis and an air outlet at which the airflow exits the chassis, wherein the first location is proximate the air inlet of the chassis and the second location is proximate the air outlet of the chassis.

18. The computer system of claim 16, wherein the management module is configured to obtain the expected airflow rate through the chassis as a function of the fan speed.

19. The computer system of claim 16, further comprising:
a lamp in communication with the management module, wherein the management module is configured to illuminate the lamp as part of the first electronic alert.

20. The computer system of claim 16, wherein the management module is configured to reduce power to the heat-generating components or power down the heat-generating components as part of generating the second electronic alert.

* * * * *